June 16, 1925.  
V. KETTELER  
1,542,251  
DIRIGIBLE HEADLIGHT FOR AUTOMOBILES  
Filed March 21, 1924

Inventor  
V. Ketteler  
By *Clarence A. O'Brien*  
Attorney

Patented June 16, 1925.

1,542,251

UNITED STATES PATENT OFFICE.

VICTOR KETTELER, OF NESHKORO, WISCONSIN.

DIRIGIBLE HEADLIGHT FOR AUTOMOBILES.

Application filed March 21, 1924. Serial No. 700,891.

*To all whom it may concern:*

Be it known that I, VICTOR KETTELER, a citizen of the United States, residing at Neshkoro, in the county of Marquette and State of Wisconsin, have invented certain new and useful Improvements in Dirigible Headlights for Automobiles, of which the following is a specification.

This invention relates to dirigible headlights for automobiles and has for its principal object to provide a simple and efficient device which will automatically turn with the automobile so that the headlights are always positioned parallel with the front wheels and the light is directed at all times on the road whether the vehicle is running straight ahead or turning around corners in either direction.

A further object of the invention is to provide a dirigible headlight construction of the above mentioned character, which will insure safer driving in the nighttime, and which will be adapted to move in synchronism with the steering wheels of the vehicle.

A still further object of the invention is to provide a dirigible headlight construction of the above mentioned character, wherein the parts are so arranged as not to interfere with the operation of the vehicle in making turns around bends or corners, the device being especially adapted for use upon Ford automobiles.

A still further object of the invention is to provide a dirigible headlight construction of the above mentioned character, which is simple in construction, inexpensive, strong and durable, and further well adapted for the purposes for which it is designated.

Other objects and advantages of this invention will become apparent during the course of the following description.

Figure 1:
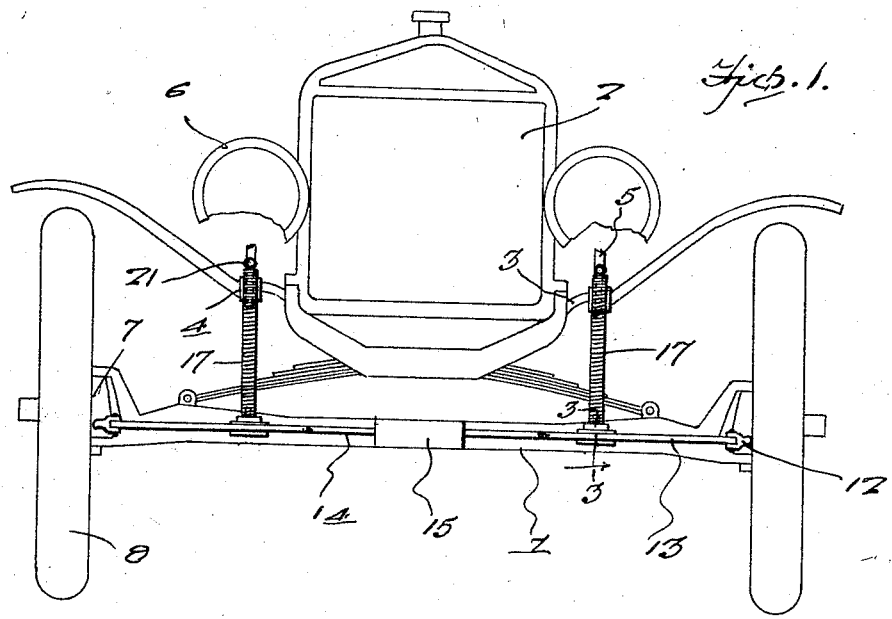
Figure 2:
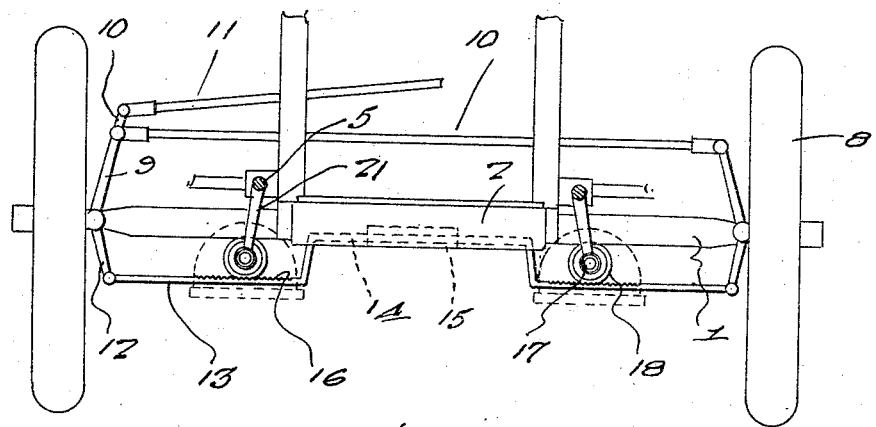
Figure 3:
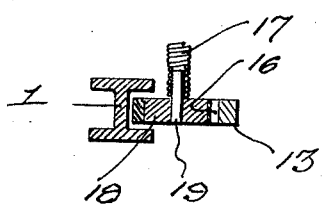

In the accompanying drawing, forming a part of this specification and in which like numerals designate like parts throughout the same, Figure 1 is a front elevation of an automobile of the Ford type showing the controlling mechanism attached thereto, Figure 2 is a plan view thereof, and Figure 3 is a sectional view taken on line 3—3 of Figure 2.

In the drawing wherein for the purpose of illustration is shown the preferred embodiment of my invention, the numeral 1 designates the front axle of an automobile preferably of the Ford type, and is channel-shaped in the manner as clearly shown in Figure 3 of the drawing. The purpose of this construction wherein the axle is channel-shaped will be hereinafter more fully described. The usual radiator is designated by the numeral 2 and the numeral 3 designates the supporting arms for the fenders 4. Each of the arms 3 is provided with the socket portion 4 in which is adapted to be supported a stem 5, the upper end of which is provided with the usual upwardly extending U-shaped brackets, the construction of which is well known in the art, and these brackets are adapted to embrace the headlights 6, in the usual manner. As this construction forms no important part in the present invention, it is not thought necessary to further go in detail relative to the same.

The steering mechanism of the vehicle includes the steering knuckles 7 which carry the usual spindles, upon which are adapted to be mounted the steering wheels 8, in the usual manner. The knuckles 7 are provided with rearwardly extending arms 9 to which is connected transversely extending connecting rods 10 at the outer ends thereof, in the manner as shown in Figure 2 of the drawing. One of the arms 9 is provided with a rearwardly extending portion 10 which provides a means for connecting thereto, the actuating rod 11, the latter being preferably associated with the steering gear of the motor vehicle in the well known manner. Extending forwardly from the knuckles 7 are the arms 12 and secured to the forward ends thereof and extending transversely across the front of the vehicle is the rod 13. The rod 13 has its central portion disposed inwardly as shown at 14 for cooperation with a suitable sleeve 15 mounted on the intermediate portion of the axle 1 and as is readily seen from the drawing, the intermediate portion of the rod 13 fits in the front face of the channel-shaped axle and the guide sleeve 15. The outer end portions of the rod 13 are spaced from the axle 1 and have their teeth 16 provided on the inner faces thereof, in the manner as clearly shown in Figure 2 of the drawing, and for the purpose to be presently described.

Extending vertically in front of the radiator 2 and preferably adjacent the sides thereof, are the flexible shafts 17. Each shaft is preferably formed of coiled spring wire and the convolutions are so arranged as to prevent the twisting of the coils which constitute the flexible shaft when the device is in operation. To this end, the coils in each of the flexible shafts are wound real tightly. Adapted to be supported on the lower end of each of the flexible shafts 17, is the roller 18. Each roller is preferably formed of rubber and is supported on the spindle 19, the upper end of which extends through the top of the roller and is secured to the lower end of the flexible shaft 17 in any suitable manner. The roller 18 mounted on each of the lower ends of the flexible shafts is further adapted to have its inner portion extending into the channel-shaped axle, while its outer portion will be adapted to be engaged by the teeth 16 formed on each of the outer end portions of the actuating rod 13, in the manner as clearly illustrated in Figure 3.

The upper end of each of the flexible shafts 17 carries thereon the stub shaft 20, the uppermost end of which is connected by means of the link 21 to the stem 5 of each of the lamp brackets whereby the lamp brackets and lamps 6 carried thereby will be caused to rotate in either direction in synchronism with the steering wheels 8.

The operation of my dirigible headlight construction may be briefly stated as follows: With the parts arranged as shown in Figures 1 and 2 of the drawing, the head lamps 6 are normally disposed directly parallel with the wheels 8 so that the rays of light from the head lamps will be directed in a straight path in front of the vehicle. When the vehicle turns in either direction, the operation of the steering gear mechanism will simultaneously cause the longitudinal movement of the rod 13 and the teeth 16 formed on the inner face thereof will engage the outer peripheral face of the other rollers 18 and will consequently impart a rotary movement thereto. As the rollers 18 are fixed to the lower ends of each of the flexible shafts 17, the latter will also be caused to rotate and the simultaneous rotation thereof will be imparted to the stems 5 which support the lamp brackets and lamps 6 supported therein so that the headlights will automatically move with the wheels 8 regardless of the direction in which the same are turned whereby the rays of light from the headlights will always be directed in a path parallel to the wheels 8. In this manner, the operation of a vehicle in the nighttime is rendered safe and the operator of the vehicle may at all times have the lights from the headlights directed on the road so that he may readily see the turns and bends in the road when the vehicle is making the turn around the same.

By providing a dirigible headlight mechanism of the above mentioned character wherein the same is adapted to move in synchronism with the steering wheels of the vehicle, there will be no danger of the driver from leaving the road with which he is not familiar when making a sharp turn or bend as frequently occurs when driving in the nighttime. The simplicity of my device enables the same to be manufactured at a very low cost and may be placed upon a motor vehicle of the Ford type in a convenient manner without having to alter any of the parts thereon materially.

While I have shown the preferred embodiment of my invention, it is to be understood that various changes in the size, shape and arrangement of parts may be resorted to without departing from the spirit of the invention and the scope of the appended claim.

Having thus described my invention, what I claim is:

A dirigible headlight gear for an automobile machine comprising a rod pivotally connected at its ends with the steering knuckles of the machine and provided with sections of gear teeth, a guide mounted upon the intermediate portion of the axle of the machine and receiving the intermediate portion of said rod, lamp posts pivoted upon the frame of the machine and provided with angularly disposed arms, gear wheels carried by the arms and meshing with the teeth of the bar and springs coiled around the lamp post and serving to hold the teeth of the gear wheels in close contact with the teeth of the bar.

In testimony whereof I affix my signature.

VICTOR KETTELER.